United States Patent [19]
Knox

[11] 4,132,869
[45] Jan. 2, 1979

[54] INTERCOMMUNICATION SYSTEM

[76] Inventor: James H. Knox, Velwell House, Velwell, Dartington, Devon, England

[21] Appl. No.: 809,416

[22] Filed: Jun. 23, 1977

[30] Foreign Application Priority Data

Jun. 25, 1976 [GB] United Kingdom ............... 26437/76

[51] Int. Cl.² ............................................. H04M 9/02
[52] U.S. Cl. ...................................... 179/38; 179/1 H
[58] Field of Search ............... 179/37, 38, 30, 1 H, 179/17 B, 1 HF

[56] References Cited

U.S. PATENT DOCUMENTS

| | | | |
|---|---|---|---|
| 3,215,781 | 11/1965 | Yong | 179/1 H |
| 3,243,512 | 3/1966 | Liberman | 179/1 H |
| 3,679,837 | 7/1972 | Liberman | 179/37 |
| 3,864,527 | 2/1975 | Topping | 179/38 |
| 3,908,093 | 9/1975 | Riley | 179/37 |

Primary Examiner—Kathleen H. Claffy
Assistant Examiner—Joseph A. Popek
Attorney, Agent, or Firm—Cushman, Darby & Cushman

[57] ABSTRACT

An intercommunication system in which a plurality of stations are interconnected by a single common line and each station is set to receive signals within a voltage "window" different from that of all the other stations of the system, and is operable to transmit signals at a voltage level selected in dependence on which of the stations is intended to receive the signals, in which all stations are further provided with a lock-out gate which disables them from transmitting when another station is already transmitting. The signal selection function and signal transfer function on the receiver part of each station are separated to permit equalization of the transmission voltage "window" for all biasing voltage levels.

20 Claims, 2 Drawing Figures

INTERCOMMUNICATION SYSTEM

The present invention relates generally to intercommunication systems, and particularly to a circuit forming one station of an intercommunication system which can be formed using a plurality of identical such circuits adjusted to operate at different biasing voltage levels, all the stations being interconnected by only two power lines and a common line on which are impressed, in use of the system, both message signals bearing the information to be transmitted, and biasing signals for determining which station of the system is to operate to receive the signals.

British Pat. No. 1,382,990 describes a circuit for forming such an intercommunication system, the circuit having a controlled gate which permits alternating current signals to pass when they are accompanied by a biasing voltage within a range preset by the biasing of the controlled gate: the circuit has an array of switch contacts by means of which a selected voltage can be applied to the common line to determine which of the other stations of the system (which are composed of identical such circuits with merely different biasing levels) is to pass the signals impressed on the common line by the calling station.

One difficulty encountered with such a system is that if the line is in use between two stations and a third station is operated at a higher voltage, this will automatically override the station already in use cutting off the already transmitting station.

The present invention seeks to overcome this difficulty by providing, according to one of its aspects, an intercommunication system of the type in which a plurality of stations are interconnected by a common line on which are impressed, in use of the system, both information signals and biasing signals for determining the recipient station, each station including gating means operable to pass signals accompanied by a biasing voltage in a selected range, in which each station has a lockout circuit, which disables that station from transmitting information signals when the common line carries a voltage greater than a predetermined minimum voltage.

Thus, when two stations are using the common line, the voltage applied to the common line by one of these two stations acts on all the other stations to prevent these from operating to transmit signals onto the common line.

Preferably the lockout circuit is provided with indicator means for visually indicating that the communication system is already in use.

In the circuit described in British Pat. No. 1,382,990 the control gate of each station which determines the voltage range within which signals are passed actually operates physically to pass the information signals from the common line to an amplifier of the station and from there to an acoustic transducer of the station. This limits audio signals to less than the "width" of each channel (in practice about 0.3v). In order to overcome this difficulty in the present invention the controlled gate is merely used to detect the presence, on the common line, of signals within the predetermined range, and controls, when the received biasing signal is at the appropriate level, another gating circuit to pass the information signals to an amplifier and an acoustic transducer. The gating circuit may comprise switching transistors or one or more electromagnetic relays. By separating the audio signals and the controlling D.C. signal at the receiving station the above-mentioned limit on the peak-to-peak swing of the audio signals is obviated so that more convenient values can be used.

According to a further aspect of the present invention, therefore, an intercommunication system comprises a plurality of stations having associated acoustic transducers, the stations being interconnected by a single common line on which are impressed, in use of the system, information signals and biasing signals for selecting the station to which the information signals are to be transmitted, in which each station includes a biasing signal gate sensitive to the said biasing signal content of the input signals from the said common line, and operative to pass a control signal to an information signal gate when the biasing signal content of the input signal from the common line falls within a selected range, the information signal gate being fed with the input signal from the common line and operating to pass the information signal content thereof only when controlled to do so by the said biasing signal gate. The biasing signal gate thus acts in a similar way to the controlled gate in intercommunication systems constructed according to British Pat. No. 1,382,990.

In a preferred embodiment of the present invention the information signal gate is a switching circuit which is controlled to conduct or not by output signals from the biasing signal gate. The switching circuit may include at least one electromechanical relay and/or may include at least one switching transistor.

In one embodiment the biasing signal gate comprises a balanced comparator circuit operable to provide an output signal when the biasing signal falls within a given range about a balance position determined by a selected biasing voltage applied to the comparator circuit. The balanced comparator circuit preferably comprises a pair of transistors of the same conductivity type in common emitter configuration, to the base of one of the two transistors of which is applied a selected biasing voltage the value of which determines the balance region of the circuit, and to the base of the other of the two transistors of which are applied the signals arriving from the common line, two diodes with their anodes both connected to a common point and their cathodes connected in respective collector circuits of respective transistors of the said pair, the output signal from the balanced comparator being taken from the said common point to which the anodes of the said two diodes are connected.

In another embodiment the biasing signal gate comprises two pairs of transistors of the same conductivity type each pair being connected in common emitter configuration to a respective constant current source, the bases of a first transistor of each pair being connected to a common point to which is applied the biasing component of the signals arriving from the common line and the bases of a second transistor of each pair being connected across a potential divider the setting of which determines the range of biasing signals from the common line which operate the gate, the collector of the first transistor of one pair and the second transistor of the other pair being connected to the emitter of a further transistor of opposite conductivity type, the base of which is connected to both the collector of the first transistor of the said other pair and the second transistor of the said one pair.

Each station preferably includes an amplifying circuit connected between the said common line and an acoustic transducer of the station by one of two relays each having two sets of contacts, a first relay being operable to connect the common line to the amplifier input and the amplifier output to the acoustic transducer, and a second relay being operable to connect the acoustic transducer to the amplifier input and the amplifier output to the common line. The said first relay constitutes the said information signal gate and is controlled by a relay control circuit forming part of the said biasing signal gate. The said relay control gate preferably comprises a pair of transistors of the same conductivity type in common emitter configuration, one of the two transistors of the relay control gate controlling the switching of a transistor in series with the said first relay.

The said relay control gate is preferably also connected to the control circuit of the second relay such that the said relay control gate is switched off, to de-energise the said first relay, if the second relay is energised.

The biasing signal gate of each station is associated with a potential divider the setting of which determines the value of the biasing signal which operates this gate.

In a preferred embodiment each station has a voltage regulator operating to control the voltage applied across the said potentiometer to be a predetermined range about the mid-point between the supply voltage across positive and negative supply rails of the system.

Each station includes an array of switches with an associated potential divider for selecting, in dependence on which switch of the array is operated, the biasing voltage applied to the common line when transmitting, and the said lockout gate operates to deprive the said associated potentiometer of the normally applied voltage when a biasing signal is impressed on the common line by any other station at a greater channel voltage than the normal standby voltage level.

Operation of one of the switches of the array determines the biasing voltage to be applied to the common line and also operates the second relay which puts the station in a "transmit" mode. In a first embodiment of the invention the interconnection between the second relay and the relay control gate of the first relay is by way of a line linking the base of the other transistor of the relay control gate to the positive side of the relay control coil of the second relay, this relay control coil being controlled by a relay control transistor switched in dependence on the state of a transmit control transistor of opposite conductivity type the base of which is connected to the said array of switch contacts. Thus, when one of the array of switch contacts is depressed a voltage determined by which of the switch contacts is depressed is applied to the base of the transmit control transistor which then conducts correspondingly switching on the relay control transistor of the second relay. The voltage at the positive side of the relay coil of the second relay then rises biasing the base of the said other transistor of the relay control gate of the first relay thereby holding this relay firmly off and consequently preventing the said first relay of the relay control gate from switching on. This thus prevents the "receive" relay from being energised while the station is in operation to transmit even if, for any reason, the appropriate voltage to reach the balance point of the balanced comparator circuit is received on the common line.

The lockout circuit which disables the stations other than the two actually using the system at any one time preferably acts to cut off the power supply to the said manually operable switch contacts when a biasing voltage is received on the common line unless the biasing voltage is the appropriate voltage to balance the two transistors of the biasing signal gate. The lockout circuit may preferably comprise a first transistor the collector emitter junction of which is connected in series between the positive power supply line and the said potential divider and the base of which is controlled by a control gate which turns the said first transistor off whenever a voltage higher than a predetermined minimum is received from the said common line.

Preferably embodiments of the present invention are formed with a "paging" facility by means of which it is possible for any one station to call all stations simultaneously, and this is achieved by providing each station with a "page" gate in addition to the said biasing signal gate, the "page" gates of each station being set to operate when a biasing signal at the maximum voltage of the system arrives from the common line so that all stations receive signals which are accompanied by the maximum biasing voltage. Of course, to make this possible the switch contact of the array which applies the paging voltage to the common line must be supplied separately from the remaining contacts in the array so that it is not locked-out when the lock-out gate switches off the power supply to the remaining switch contacts of the array. Likewise, it is important that the reception of a paging signal should override the station which is transmitting at any one time so that it is commuted to its "receive" mode to receive the paging signal and for this reason the second relay (which is the "transmit" relay) must be de-energised before the first relay is energised upon reception by the page gate of the paging signals. For this reason the relay control gate of the second relay is connected directly to the common line in such a way that this gate is commuted so that the second relay is switched off if the voltage applied to the common line exceeds that applied by the switch contacts of the array, upon selective depression of one of these, to the base of one of the transistors of the relay control gate of the second relay.

Two embodiments of the present invention will now be more particularly described, by way of example, with reference to the accompanying drawings, in which.

Figure 1:
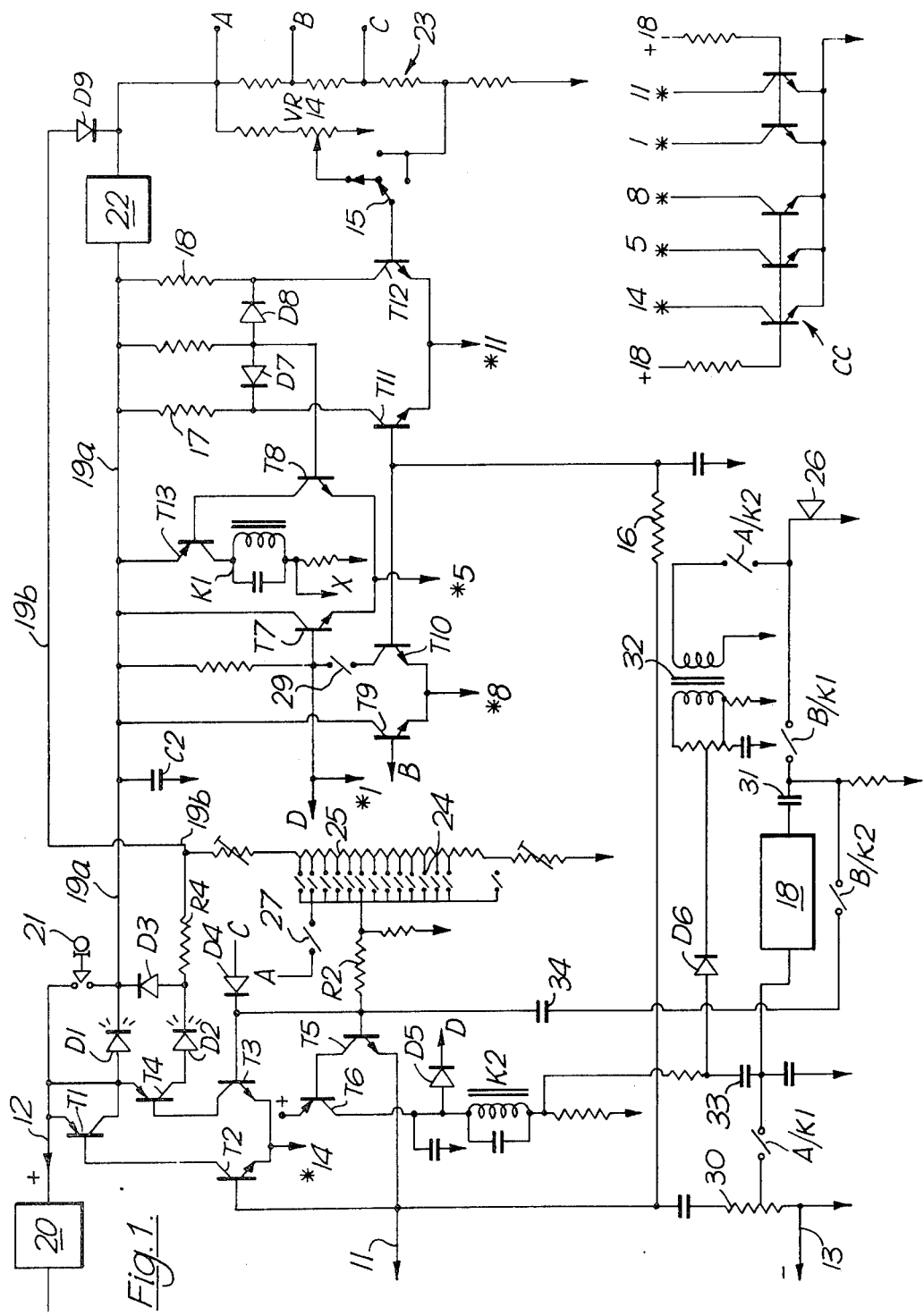
FIG. 1 is a schematic circuit diagram of one embodiment of the invention.

Referring first to FIG. 1 there is shown one station of an intercommunication system. In this system all stations are substantially identical except that the biasing voltage of each station in the system are unique. Thus, all stations are masters and can operate to call any other station providing the system is not already in use.

Signals to and from the station are applied on a common line 11 and power to the stations is provided between positive and negative rails 12, 13 respectively. Each station in the system is biased to receive signals within a given voltage range and to be insensitive to signals outside this voltage range. The particular voltage range of each station is determined by the setting of a rheostat 14 which is connected via a switch 15 to the base of a first transistor T12 which is connected in common emitter configuration with a transistor T11. The two transistors T11, T12, together form an input selection gate, the base of the transistor T11 being connected, via a resistor 16 to the common line 11. The collectors of the transistors T11, T12 are connected via identical resistors 17, 18 to a power line 19a fed via a light emitting diode D1 and a first power input transistor T1 from the power line 12.

The line 19a is also fed via a regulator 22 and diode D9 through an alternative route from a line 19b including a resistor R4, a light emitting diode D2 and a second power input transistor T4 the emitter of which is also connected to the power line 12. Upstream from the station shown in the drawing is a current sensitive trigger circuit 20, which acts to shut down the main power supply after a predetermined time if the system is not in use so that only a quiescent current is consumed. The line 19a is connected to the line 12 by a normally open push button switch 21 and is earthed via a capacitor C2. When the push button 21 is depressed the capacitor C2 starts to charge and the current surge on the initiating of the charging of the capacitor C2 throws the trigger circuit 20 to connect the full power supply to the line 12. In use of the system frequent pulses due to various current surges on the line 12 keep the trigger switched and the main power supply in the circuit; a predetermined time (say, five minutes) after the last occurrence of a pulse, indicating that the system is no longer in use, the trigger throws to shut down the main power supply to a low voltage. The power input transistors T1 and T4 are controlled by a transistor gate comprising two transistors T3, T2 in common emitter configuration which gate will be called the "lockout" gate for reasons which will be explained more fully below. The base of the first gating transistor T2 is connected to the common signal line 11 and the base of the second gating transistor T3 is connected to a diode D4 which is connected to a point C on a resistor chain generally indicated 23, which is fed from the power supply line 19. The cathode of the diode D4 is also connected to the base of a transistor T5 and, via a resistor R2 to an array of manually operable contact switches 24 which are connected to different tappings on a resistor 25 fed from the power supply line 19b.

When the push button 21 is depressed to initiate the operation of the circuit the capacitor C2 charges and the full power of, in this example, 18 volts is applied to the line 12. A voltage corresponding to the middle of the lowest voltage range of the set of ranges to which the stations are individually responsive is applied to the common line 11 either by one of the stations or by the power supply (not shown). In this example this voltage is 2.1 volts and this biases the transistor T2 to its non-conducting state so that the transistor T3, which is fed from the point C on the potentiometer 23 is conducting. The transistors T2 and T3 are also biased by a constant current source, schematically illustrated in the drawing by a set of transistors CC the associated transistor being indicated by reference numerals preceded by asterisks. Thus, the emitters of the transistors T2, T3 of the lockout gate are connected to terminal *14 of the constant current source CC. Because the transistor T3 is conducting in the normal or "stand-by" mode of the station the transistor T4, which is of opposite conductivity type, is also conducting and therefore the diode D2 is forward biased. Conveniently, the diodes D1 and D2 are light emitting diodes of different colours, the diode D1 being, for example, red and the diode D2 being green. When the circuit is in stand-by mode the green light-emitting diode is illuminated: the diode D3 is also forward biased so that power is fed both to the line 19b and to the line 19a.

When a voltage is applied to the common line 11 by a station other than the station illustrated, the increased voltage turns on the transistor T2 thereby turning off the transistor T3. The transistor T4 is thus turned off and the transistor T1 is turned on. Current is then fed through the red light-emitting diode D1 to the power line 19a, but is not fed through the transistor T4 to the green light-emitting diode D2. The diode D3 is now reversed biased as is the diode D9 and therefore the resistor 25 which feeds the array of switch contacts 24 is isolated so that all stations except the transmitting station are "locked-out" from the common line and cannot transmit; depression of one of the switch contacts will have no effect (except of course the page switch which will be described in greater detail below).

If the voltage applied on the common line 11 is that to which the station illustrated is biased by the resistor 14 and switch 15 in the base circuit of the transistor T12, the transistor T11 the base of which is connected via the resistor 16 to the common line 11 is biased to the point where it just conducts so that both the transistors T11 and T12 are conducting. The collectors of the transistors T11, T12 are connected by two back-to-back diodes D7, D8 the anodes of which are connected to a resistor 17 which is fed from the power line 19a. The common point between the two diodes D7, D8 is also connected to the base of a transistor T8 which forms a transistor gate with a further transistor T7 in common emitter configuration with the transistor T8, the common emitters being connected to terminal *5 of the constant current source. The collector of transistor T8 is connected to the base of a PNP transistor T13 the emitter of which is connected to the power line 19a and the collector of which is connected in series with a relay coil K1. The relay K1 has two sets of contacts, A/K1 and B/K1. The contacts A/K1 are connected betwee the input of an amplifier 18 and the common line 11 to which it is connected via the adjustable tapping of a potentiometer 30. The contacts B/K1 of the relay K1 are connected between the output of the amplifier 18, via a capacitor 31, and an acoustic transducer 26.

The base of the transistor T7, in addition to being connected to the terminal *1 of the constant current source, is also connected as indicated by the connection "D" to the cathode of a diode D5 the anode of which is connected between the collector of a transistor T6 and a second relay coil K2. There are two relay contacts A/K2 and B/K2 of the relay K2, the contacts A/K2 being connected between the acoustic transducer 26 and the input of the amplifier 18 (via a transformer 32, diode D6 and capacitor 33), and the contacts B/K2 are connected between the output of the amplifier 18 and (via capacitor 34) the base of the transistor T5.

In the normal "stand-by" condition the transistor T12 is conducting and the transistor T11 is cut-off so that the diode D8 is forward biased and the diode D7 is reversed biased. If a voltage is applied on the line 11 which is substantially lower than the voltage to which the transistor T12 is biased, the transistor T11 does not reach a conducting state and therefore the current flow through the diodes D7 and D8 does not change. If, on the other hand, the voltage applied to the line 11 is substantially greater than the biasing voltage applied to the base of the transistor T12 the transistor T11 is biased to conduct hard and the transistor T12 is cut-off, in which case the diode D7 becomes forward biased and the diode D8 becomes reversed biased: thus the voltage at the common point to which the anodes of the diodes D7 and D8 are connected, apart from transients, does not change.

If, on the other hand, the voltage applied to the line 11 is within a certain range about the applied to the base of the transistor T12, the transistor T11 is biased just into its conducting state so that the transistor T12, although it is no longer conducting hard, is not switched off. The diodes D7 and D8 are now both just forward biased and current flows through both. This causes the voltage at the common point between the two anodes of the diodes D7 and D8 to rise thereby turning on the transistor T8 which, in its conducting state, turns on the transistor T13 thereby allowing current to flow through the relay coil K1 causing the relay contacts A/K1 and B/K1 to close, putting the station in its "receive" mode where signals applied, together with the above mentioned, biasing voltage on the line 11 will be amplified by the amplifier 18 and reproduced by the acoustic transducer 26.

To transmit signals from the station on the signal line 11 one of the switch contacts 24 in the array is depressed; this causes a biasing voltage, depending on the choice of switch contact, to be applied via the resistor R2 to the base of transistor T5 thereby turning this transistor on and applying the biasing voltage to the line 11. When the transistor T5 turns on, it also turns on the transistor T6 which is of opposite conductivity type and current flowing through the transistor T6 energises the relay coil K2 closing the relay contacts A/K2 and B/K2 setting the station in its "transmit" mode. Any electrical signals produced by the acoustic transducer 26 are now fed through the amplifier 18 and to the base of the transistor T5 where they are further amplified before being fed to the common line 11, together with the biasing voltage fed to the common line 11 by the transistor T5 from the selected one of the switch contacts 24.

The lockout gate is not switched to remove the feed voltage from the resistor 25 which feeds the array of switch contacts 24 when the station is in its "transmit" mode because the base of the transistor T5 is connected to the base of the transistor T3 and therefore any voltage above the minimum voltage applied to the transistor T3 holds this transistor hard on maintaining the transistor T2 switched hard off. Since the transistor T3 is turned on the transistor T4 conducts and current is thus fed through the light emitting diode D2 to both branches 19a and 10b of the power line maintaining the power fed to the resistor 25.

Each station is also provided with a "page" gate set to the highest voltage range in the series. The page gate comprises two transistors T9, T10 in common emitter configuration, the two emitters both being connected to the terminal *8 of the constant current source. The base of transistor T9 is connected to point B on the potentiometer 23 which is set at 9.5 volts. The two collectors of the transistors T9, T10 are both fed from the common line 19a, the collector of the transistor T10 being connected to the base of the transistor T7 of the relay control gate comprising the transistors T7, T8. The array of switch contacts 24 is provided with one contact 27 which is fed directly from point A at 10.5 volts independently of the resistor 25 so that this switch contact is not cut-off when the remaining switch contacts are isolated upon reception of a signal from the common line 11. The transistor T9 is normally conducting hard when the station is in its "standby" mode and the transistor T10 is normally cut off.

When the 9.5 volt biasing voltage is applied to the common line 11 it turns on the transistor T10 (all other voltages which can be applied to the line 11, being lower than 9.5 volts, are too low to do this), and so all stations, including any station which may be receiving signals already, are set to the "receive" mode by the page gate T9, T10 as follows. When the transistor T10 conducts it lowers the voltage at the base of the transistor T7 thereby switching this transistor off and forcing the transistor T8 of the gate to conduct hard thereby turning on the transistor T13 and feeding current to the relay coil K1 which sets the station in the "receive" mode. If any station is transmitting when the page signal arrives its transistor T5 and therefore transistor T6 will be conducting so that the relay K2 is turned on. Reception of the voltage at 9.5 volts at the emitter of the transistor T5, however, turns this transistor off so that transistor T6 is also turned off and the relay K2 de-energised. The page gate T9, T10 of the transmitting station operates in the same way as for all other stations, to set this station in the "receive" mode. A normally closed manually operable switch 29 between the collector of the transistor T10 and the base of the transistor T7 gives a user the opportunity to override the paging signals by disconnecting the transistor T10 of the page gate from the power line 19a so that, for example, if it is required to remain undisturbed except for directly addressed calls the page gate can be "muted".

Commutation of the switch 15 between the base of the transistor T12 and the biasing resistor 14 from its normal position to its alternative position connects the transistor T12 to the lowest biasing voltage so that, if desired, this can be done at some or all stations so that they can be used together as a "conference" circuit since they will then all be biased to the same level. The voltage difference between the conference level and the next higher channel is approximately 1.0 volt, chosen to be sufficient to shut off transistor T5 thus switching any station in the "conference" mode which may be transmitting into "standby" mode and, if selected by channel or page voltage, to "receive" mode.

The provision of such a "conference" level, at the lowest biasing voltage also has other advantages, since by switching any station to permanently transmit on the conference voltage level (2.1V), it is possible to listen, intermittently or permanently, on the conference level, at any other unit, so that babysitting or sick room monitoring can be achieved anywhere in the system. Further, since the voltage does not energise the "line busy" and "transmit lockout" circuits, normal usage of the system can continue since normal and page voltages can be superimposed on the line with their associated audio signals. During such usage, the babysit/monitor function would, of course, be overridden, but it automatically returns when the system is no longer being used for the communications. It is therefore possible to transmit and be heard in the nursery/sickroom without any switching at the nursery/sickroom end. It is even possible to listen to both simultaneously and selectively talk to each as required.

It is also possible for any unit to be contacted by normal channel select or page even when tied up "monitoring". When long term monitoring usage is required, however, the remote power supply shut down unit 20 has to be switched out to prevent it from closing down the power supply if no signals are received for some time.

Figure 2:
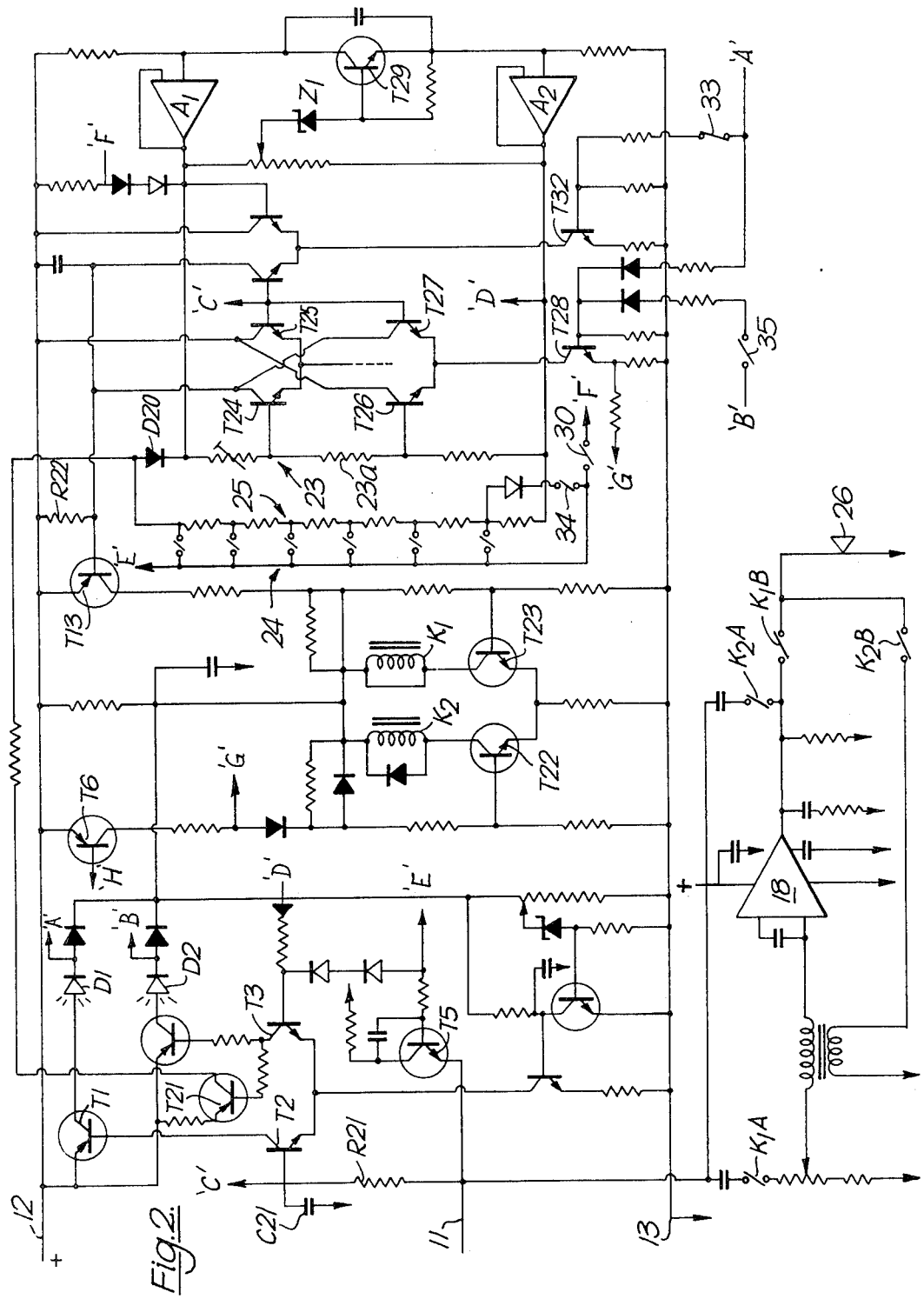
FIG. 2 is a schematic circuit diagram of a second embodiment of the invention.

Referring now to FIG. 2 there is shown a schematic circuit diagram of an alternative embodiment which incorporates automatic voltage regulation of the circuit operation to accommdate variations in the supply voltage which may be due, for example, to the use of long conductors interconnecting the various stations of an intercommunication system. This means that all stations can be manufactured identically with identical circuit components, apart from the components which uniquely identify that station, but will operate satisfactorily even though the voltage on the supply lines may be different from that for which the circuit is normally designed. For example, a 12 volt normal supply line may rise, on occasion, to 15 volts or may fall, because of the length of the connecting lines, to as little as 8.5 volts. Voltage regulation is achieved by clamping to the mid point of the voltage drop across the positive and negative supply lines and feeding the channel selection gate via operational amplifiers which are respectively a fixed amount above and a fixed amount below the mid point.

In the embodiment of FIG. 2 circuit components which fulfil the same function as corresponding circuit components in FIG. 1 have been assigned the same reference numeral even though the circuit components and/or the circuit configuration in which they are connected may not be exactly identical. Thus, the transistors T1 and T4 controlling light emitter diodes D1 and D2, and controlled by the state of transistors T2, T3, in dependence on the value of voltage signals on the speech line 11 are all substantially as in the embodiment of FIG. 1. The lockout circuit works in a similar way although this now involves the use of a further transistor T21 the emitter of which is connected between the emitters of transistors T1 and T4, and the base of which is connected to the collector of transistor T3. The collector of transistor T21 is connected to a diode D20 and to the end of the resistor chain 25 with associated switch contacts 24 which determine the transmitting voltage bias. The diode D20 feeds a resistor chain 23 the values of which determine the biasing of a transistor gate comprising four transistors T24, T25, T26 and T27. The bases of transistors T24 and T26 are connected across a resistor 23a of the resistor chain 23 and the emitters of the four transistors are connected together in pairs, T24 and T25 together and T26 and T27 together and to respective constant current sources, only one of which, constituted by the transistor T28 is illustrated in the diagram. The bases of transistors T25 and T27 are connected together to point C which is joined to point C at the base of transistor T2 which is connected via a resistor R21 to the speech line 11. This resistor, together with a capacitor C 21 in parallel, constitute an audio filter which removes the audio frequency content of signals arriving on the speech line 11 and feeds just the biasing voltage to the bases of transistors T25 and T27. Finally, the collectors of transistors T24 and T27 are connected together and to the base of transistor T13, and the collectors of transistors T26 and T25 are connected together and to the positive line 12 to which the emitter of transistor T13 is connected. A resistor R22 is connected across the base-emitter junction of the transistor T13. The transistor gate operates to select incoming signals having a voltage bias within a given range to energise receive relay K1 to put the amplifier 18 of the circuit in the receive mode as follows: If the biasing on the speech line 11, which is applied to point C is too low transistors T25 and T27 are both cut off and transistors T24 and T26 are conducting. This permits a small current flow from the two constant current sources to either side of the resistor R22 and the biasing on the transistor T13 is thus not sufficient to turn this transistor on. Likewise, if the biasing on the point C rises to high, both transistors T25 and T27 will be switched on and transistors T24 and T26 will be switched off so that, again, a small current (in the region of 0.5mA) flows through each of the transistors T27 and T25 to respective sides of the resistor R22 and the biasing on the transistor T13 does not change. The resistor R23a is selected to provide a voltage drop across the bases of transistors T24 and T26 in the region of 0.2 volts and this difference in the biasing of the two transistors determines the width of the "window" of biasing voltage levels applied to the point C at which transistor T24 will be conducting while transistor T25 is non-conducting before transistor T26 starts to conduct so that transistor T27 is also conducting. The currents from transistor T27 and transistor T24 are combined and fed to the base of transistor T13 to saturate this turning on transistor T23 and energises the relay K1.

The voltage across the resistor chain 23 is controlled by the voltage regulator constituted by two operational amplifiers A1 and A2 and a transistor T29 having an associated Zener diode Z1 connected in its base circuit to a variable resistor R23. This voltage regulator ensures that the voltage drop across the resistor chain 23 is accurately maintained at a fixed voltage centred on the mid point between the voltage applied across the positive and negative rails 12, 13 so that notwithstanding any variation in the voltage applied to the station, the transistor gate comprising the four transistors T24–T27 always operate at a given voltage on the speech line 11.

The transistor T21 operates the lockout by turning off when the transistor T1 is turned on by saturation of the transistor T2 when a voltage above a fixed value is applied to the speech line 11 thereby depriving the resistor chains 23 and 25 of power. At the same time the transistor T4 turns off extinguishing the green light emitting diode D2, the red emitting diode D1 now being energised by the conduction of the transistor T1.

Paging facility by a switch 30 which operates the system at the highest biasing voltage, which is detected by a page gate constituted by two transistors T30, T31 to apply constant current via a constant current source transistor T32 are also provided. Likewise, a page mute switch constituted by the normally closed contact 33 and energised from the cathode of the light emitting diode D1 is provided.

As in the embodiment of FIG. 1 a conference circuit arrangement is also provided at the lowest biasing voltage level with an operating switch 34 for "talk" and a switch 35 for "listen". The constant current source for the receive "window" gate is energised by source "A" 0.5ma or source "B" 1.0ma. This is done to allow "baby sitting" monitoring and still permit overriding on normal channel select voltages or page. It can be cut off via "G" if said station decides to transmit.

I claim:
1. In an intercommunication system of the type comprising:
   a plurality of stations,
   a single common signal line interconnecting said plurality of stations, on which line said stations impress, in use of the system, both information signals and biasing signals for determining the recipient station,
   gating means in each station operating to pass signals accompanied by a biasing voltage to which said gating means of that station are preset, the improvement wherein each station has a lockout circuit operating to disable that station from transmitting information signals onto said common line when said common line carries a voltage greater than a predetermined minimum voltage.

2. In an intercommunication system of the type comprising:
a plurality of stations each having an acoustic transducer,
a single common line interconnecting said stations, on which line said stations impress, in use or the system, information signals and biasing signals for selecting the station to which the information signals are to be transmitted,
the improvement wherein: each station includes:
an information signal gate,
a biasing signal gate,
means connecting said biasing signal gate to said common line whereby said biasing signal gate is fed with input signals arriving on said common line,
means interconnecting said biasing signal gate and said information signal gate, said biasing signal gate being sensitive to the biasing signal content of said input signals from said common line, and operating to pass a control signal to said information signal gate when the biasing signal content of said input signals from said common line falls within a selected range,
means connecting said information signal gate to said common line whereby said information signal gate is fed with said input signals arriving on said common line, said information signal gate operating to pass the information signal content of said input signal to said acoustic transducer only when controlled to do so by said biasing signal gate.

3. An intercommunication system as in claim 2, wherein said information signal gate is a switching circuit controlled to conduct or not by the output signal from said biasing signal gate.

4. An intercommunication system as in claim 3, wherein said switching circuit includes at least one electromechanical relay.

5. An intercommunication circuit as in claim 3, wherein said switching circuit includes at least one switching transistor which, when conducting, passes the information signal content of said input signals to said acoustic transducer.

6. An intercommunication circuit as in claim 2, wherein said biasing signal gate comprises a balanced comparator circuit having a reference input to which is applied a selected biasing voltage, said comparator circuit operating to provide an output signal when the biasing signal content of said input signals falls within a given range about a balance position determined by said selected biasing voltage applied to said reference input of said comparator circuit.

7. An intercommunication system as in claim 6, wherein said balanced comparator circuit comprises:
a pair of transistors of the same conductivity type in common emitter configuration, the base of one of said two transistors constituting said reference input to which is applied said selected biasing voltage the value of which determines the balance region of said circuit, the base of the other of said two transistors being connected to said common line whereby to receive the input signals arriving therefrom; and
two diodes with their anodes both connected to a common point and their cathodes connected in respective collector circuits of respective transistors of said pair, the output signal from said balanced comparator being taken from said common point to which the anodes of said two diodes are connected.

8. An intercommunication system as in claim 1, wherein each station includes:
an acoustic transducer,
an information signal gate,
a biasing signal gate,
means connecting said biasing signal gate to said common line whereby said biasing signal gate is fed with input signals arriving on said common line,
means interconnecting said biasing signal gate and said information signal gate, said biasing signal gate being sensitive to the biasing signal content of said input signals from said common line, and operating to pass a control signal to said information signal gate when the biasing signal content of said input signals from said common line falls within a selected range, and
means connecting said information signal gate to said common line whereby said information signal gate is fed with said input signals arriving on said common line, said information signal gate operating to pass the information signal content of said input signal to said acoustic transducer only when controlled to do so by said biasing signal gate.

9. An intercommunication system as in claim 8, wherein each said station includes:
an amplifying circuit,
selector means for selectively conditioning said station to transmit signals onto said common line, and first and second relays each having two sets of contacts, said first relay operating when energised by input signals arriving on said common line to connect said amplifier input to said common line and said amplifier output to said acoustic transducer, and said second relay operating, when energised by conditioning of said station to transmit signals onto said common line, to connect said acoustic transducer to said amplifier input and said amplifier output to said common line.

10. An intercommunication system as in claim 9, wherein said first relay constitutes said information signal gate and is controlled by a relay control gate forming part of said biasing signal gate.

11. An intercommunication system as in claim 10, wherein said relay control gate comprises a pair of transistors of the same conductivity type in common emitter configuration, one of the two transistors of said pair controlling the switching of a transistor in series with said first relay.

12. An intercommunication system as in claim 10, wherein said relay control gate is also connected to the control circuit of said second relay, whereby said relay control gate is held switched off, to de-energise said first relay, if said second relay is energised.

13. An intercommunication system as in claim 2, wherein said biasing signal gate of each station is associated with a potential divider the setting of which determines the value of the biasing signal which operates this gate.

14. An intercommunication system as in claim 13, wherein each station has a voltage regulator operating to control the voltage applied accross said potential divider to be a predetermined range about the mid-point between the supply voltage applied across positive and negative supply lines of the system.

15. An intercommunication system as in claim 2, wherein said biasing signal gate comprises two pairs of transistors of the same conductivity type, each pair being connected in common emitter configuration to a respective constant current source,
   means connecting the base of a first transistor of each pair to a common point,
   means connecting said common point to said common signal line operating to apply said biasing component of said input signals arriving from said common line to said common point,
   a potential divider,
   means connecting the bases of the second transistors of each pair across said potential divider, the setting of said potential divider determining the range of biasing signals from said common line which operate said biasing signal gate, a further transistor of opposite conductivity type to said first and second transistors of each said pair,
   means connecting the collector of the first transistor of one pair and the collector of the second transistor of the other pair to the emitter of said further transistor,
   means connecting the base of said further transistor to both the collector of said first transistor of said other pair and the collector of said second transistor of said one pair.

16. An intercommunication system as in claim 1, wherein each station includes a potential divider,
   means connecting said potential divider to a power supply line,
   an array of switches connected at different points along said potential divider for selecting, in dependence on which switch of the array is operated, the biasing voltage applied to said common line when transmitting information signals onto said common line, and said lock-out circuit operates to isolate said potential divider from said power supply line when a biasing signal greater than said predetermined minimum voltage is impressed on said common line.

17. An intercommunication system as in claim 16, wherein said lockout circuit comprises:
   a first transistor,
   means connecting the collector-emitter junction of said first transistor in series between said power supply line and said potential divider, and
   a control gate connected to the base of said first transistor and operating to turn said first transistor off whenever a voltage higher than a predetermined minimum is received from said common line.

18. An intercommunication system as in claim 16, wherein said array of switch contacts includes a "page" contact,
   means connecting said "page" contact form a part of said power supply line which bypasses said lockout circuit so that the station can operate to transmit information signals accompanied with a biasing signal at a "paging" level even when the biasing signal above said predetermined minimum voltage is already impressed on said common signal line.

19. An intercommunication system as in claim 18, wherein each station has a "page" gate in addition to said gating means, said "page" gate of each said station being set to operate when a biasing signal at the maximum voltage of the system arrives from said common signal line so that all stations receive signals which are accompanied by said maximum biasing voltage.

20. An intercommunication system as in claim 1, wherein each station includes a voltage regulation circuit clamping the operating point of said gating means of the station to a voltage determined with reference to the mid-point of the applied voltage between two power lines.

* * * * *